United States Patent [19]

David

[11] Patent Number: 5,594,994
[45] Date of Patent: *Jan. 21, 1997

[54] TREE STAND RANGEFINDER AND METHOD OF USING THE SAME

[76] Inventor: John M. David, 2059 Huntington Ave., No. 311, Alexandria, Va. 22303

[ * ] Notice: The term of this patent shall not extend beyond the expiration date of Pat. No. 5,467,531.

[21] Appl. No.: 560,623

[22] Filed: Nov. 20, 1995

Related U.S. Application Data

[63] Continuation of Ser. No. 277,577, Jul. 20, 1994, Pat. No. 5,467,531.

[51] Int. Cl.⁶ .................. G01C 3/12; G01C 3/10
[52] U.S. Cl. ............... 33/284; 33/283; 33/277; 356/20

[58] Field of Search ................ 33/284, 276, 277, 33/278, 280, 282, 283; 356/20, 21, 3, 11

[56] References Cited

U.S. PATENT DOCUMENTS 2,279,321  4/1942  Janssen .................................. 33/284
5,467,531  11/1995  David .................................... 33/284

*Primary Examiner*—Christopher W. Fulton
*Attorney, Agent, or Firm*— Shlesinger Arkwright & Garvey

[57]  ABSTRACT

A hand held device adapted to be used by an archer situated in an elevated position to aid in the determination of the approximate ground distance to a stationary or moving target in a simple and efficient manner in order that he might thereby increase his chances of hitting the target.

9 Claims, 5 Drawing Sheets

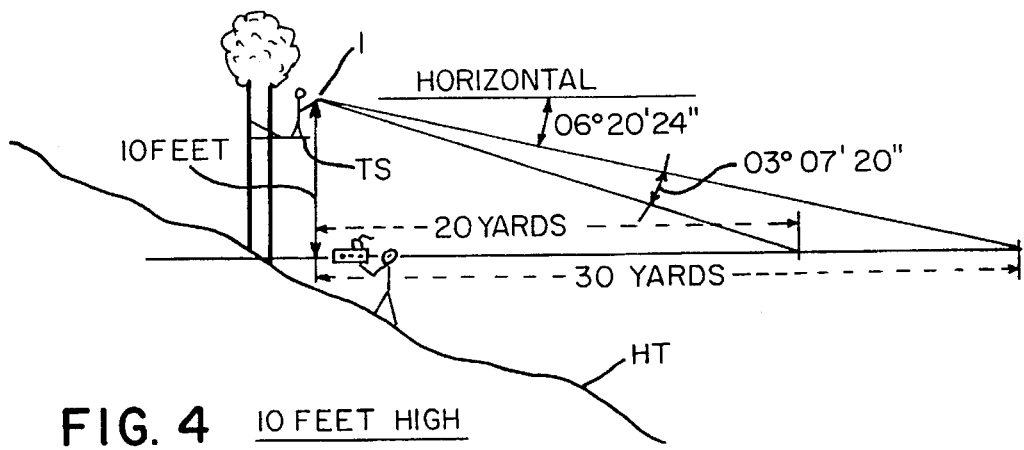
FIG. 4   10 FEET HIGH
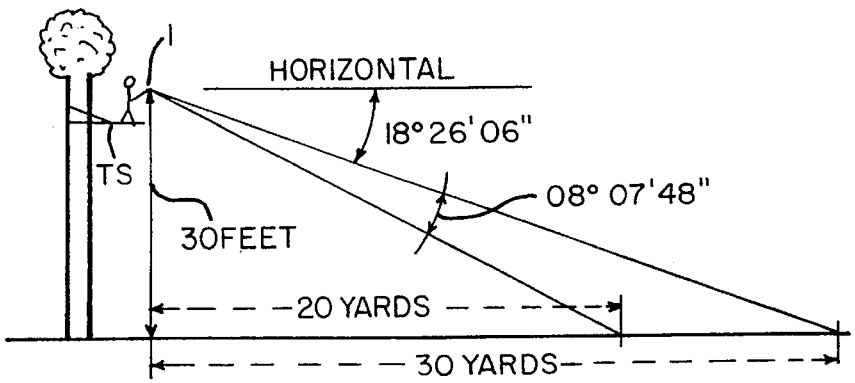
FIG. 5   30 FEET HIGH
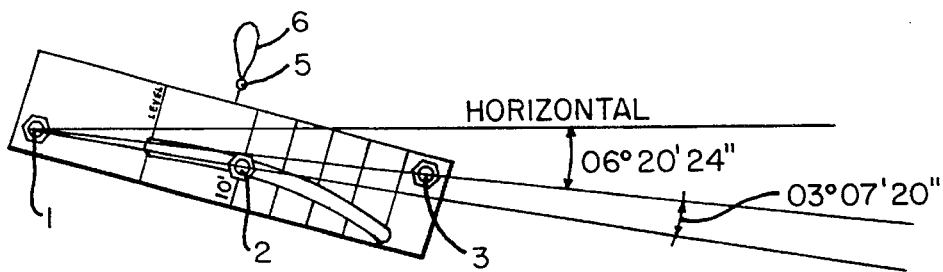
FIG. 6   10 FEET HIGH

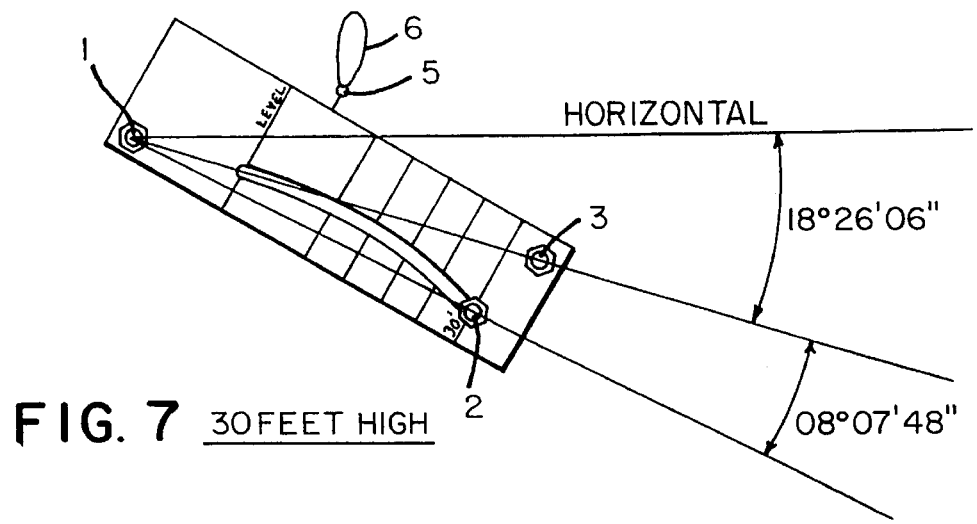
FIG. 7  30 FEET HIGH
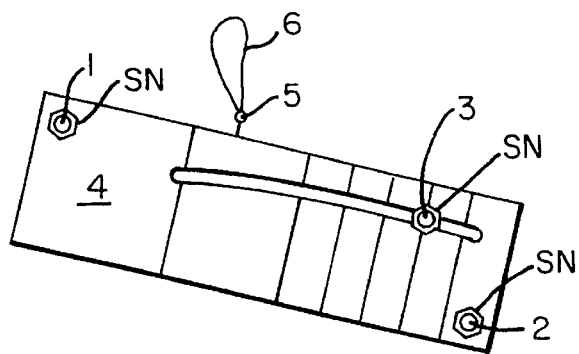
FIG. 8
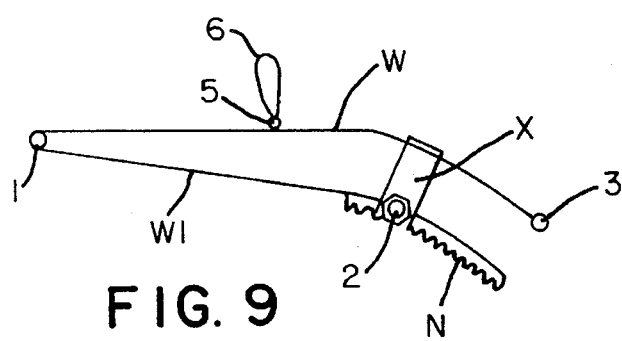
FIG. 9
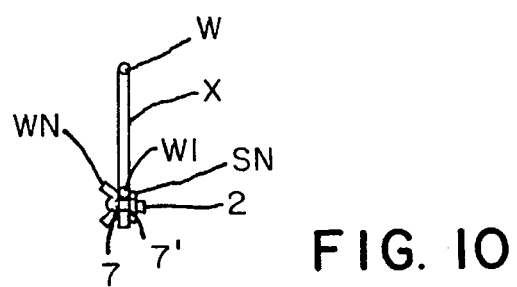
FIG. 10

TREE STAND RANGEFINDER AND METHOD OF USING THE SAME

CROSS-REFERENCE TO RELATED APPLICATIONS

This is a continuation of application Ser. No. 08/277,577, filed Jul. 20, 1994, now U.S. Pat. No. 5,467,531.

BACKGROUND OF THE INVENTION

Archery has become increasingly popular over the past few years as evidenced by various tournaments and competitions where archers shoot at targets either in an indoor or outdoor environment in order to determine their level of skill. Additionally, game hunting with bows and arrows is on the rise and, usually, the archer is in an elevated position in a tree stand where he can survey the ground area around him. As the hunter has few opportunities to shoot at game, it is important that he determine the distance to the game in a quick and efficient manner. This distance determination is important when a compound bow is being used as this type of bow is equipped with a string peep sight and sight pins which have been pre-set at known yardages, such as 20, 30 etc. yards in order for the archer to easily determine the distance to the game and thereby assist him in aiming and shooting of the arrow. Therefore, any assistance that can be provided to determine which sight pin should be selected would increase his chance of success.

Heretofore, these distances were determined by the hunter in various ways. He could, at some point beforehand, pace off the radial distances from the tree in which the stand is located and then use landmarks or place markers to establish/designate distances therefrom. He could also rely on commercially available optical rangefinders, which are both cumbersome and costly, or he could just guess at the distance.

The present invention is directed to a simple hand held device which can be suspended from the hunter's hand, and by eyeing fixed and adjustable sight pins he can readily determine the distance to the target and select the proper bow sight pin accordingly.

SUMMARY OF THE INVENTION

In the present invention the drawbacks of the prior practices are overcome by providing a simple hand held device which is lightweight, compact and inexpensive, and includes fixed sight pins and an adjustable pin which is positioned in a calibrated slot indicative of the hunter's distance above the ground. Once the adjustable pin is set the device can be eyed to determine ground distances and the proper bow sight pin selected in accordance therewith.

In one embodiment of the invention, the device preferably includes two fixed sight pins and a sliding bracket positioned to indicate the hunter's distance above the ground. Once the bracket is set to correspond to the above-ground height, the device can be eyed to determine a pre-set ground distance.

DESCRIPTION OF THE DRAWINGS

FIGS. 4 and 5 show several trigonometric layouts indicating distances determined by the hunter's elevated position;

FIGS. 6 and 7 show closeups of the device angularly disposed to correspond to FIGS. 4 and 5, respectively;

FIG. 8 is a side elevational view of a second embodiment of the invention;

FIG. 9 is a schematic illustration of a third embodiment of the invention;

FIG. 10 is a front elevational view of the device shown in FIG. 9;

DETAILED DESCRIPTION

Figure 1:
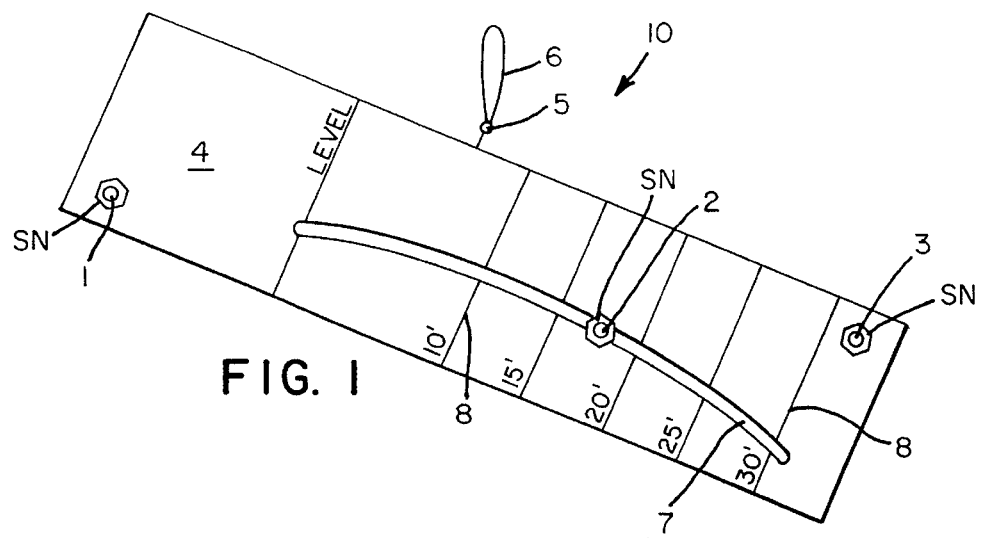
FIG. 1 is a top view of the device of the present invention.
Figure 2:
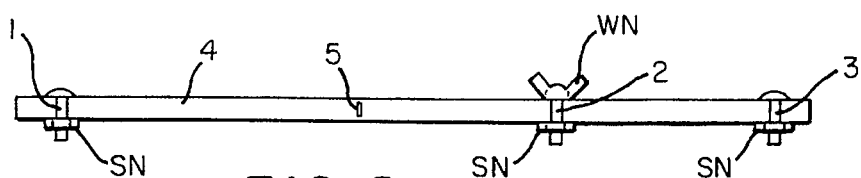
FIG. 2 is a side view thereof.
Figure 3:
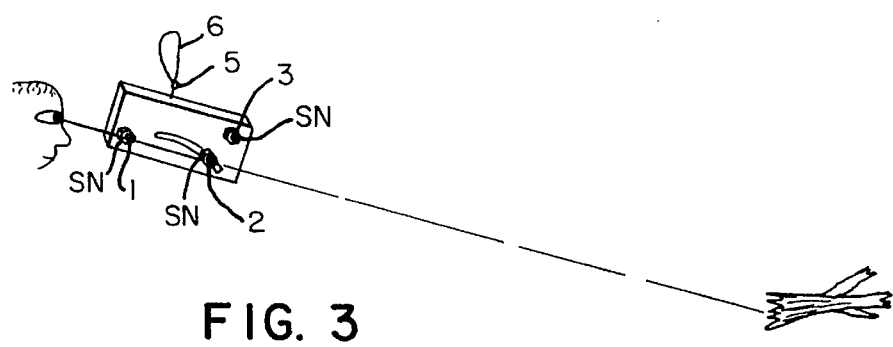
FIG. 3 is an angled view showing the manner in which the same is positioned with respect to the user's eyes.

With reference to FIGS. 1, 2 and 3, the rangefinder of the present invention is designated generally as 10, and is seen to be comprised of a rectangular base member 4 of any selected length and width with fixed sight pins 1 and 3 diagonally opposing one another. Additionally a generally medially disposed gently curving slot 7 is formed in the base 4 and has a slidably adjustable pin 2 disposed therein. The slot 7 is provided with a plurality of indicia lines incrementally increasing from a 10 foot setting to 30 feet and beyond, for example, which, in use, will designate the hunters above ground distance for reasons to be explained hereinafter. Since it is known that generally deer are shot within a 20 to 30 yard range of the archer, which corresponds to the 20 and 30 yard pins of the bow, the rangefinder was designed with these parameters in mind, although it is to be understood that the rangefinder can be designed to determine other distances.

With continuing reference to these Figures, the pins 1, 2 and 3 are comprised of screws and nuts SN with the nut of adjustable pin 2 being a wing nut WN to facilitate the loosening and tightening of the same along the slot 7. Alternatively, if the device is made from plastic, pins 1 and 3 can be integrally formed with the base 4 while the pin 2 can be a separate element frictionally disposed in the slot 7.

A suspension means for the base 4 is disposed on one edge thereof, and is comprised of an eye screw 5 having a loop 6 of any material threaded therethrough adapted to be slipped over the archer's finger during use.

With reference to FIG. 4, it is seen that with the archer positioned at an elevation of 10 feet the angle from the horizontal to the 30 yard marker is 6° 20 24" while the angle to the 20 yard marker is an additional 3° 7 20". Whereas in FIG. 5, with the archer at a 30 foot elevation, the 30 yard angle is 18° 26 06" below horizontal and the 20 yard angle is 8° 07 48".

It should then be apparent that the higher elevation will cause a larger angle as compared to a lower elevation, but the 20 and 30 yard distances will always remain the same.

FIGS. 6 and 7 depict the angle at which the rangefinder 10 is disposed relative to FIGS. 4 and 5 respectively and disclose the trigonometry involved in calibrating slot 7.

The position and curvature of slot 7 was determined by reverse engineering the same by applying trigonometric principles. Initially, pins 1 and 3 were placed on base 4 as shown in FIG. 1 with pin 3 designating the 30 yard distance while pin 1 served as the rear sight pin therefor. After calculating the necessary angles at a given height (30 feet—FIG. 5 for example) from the horizontal to the 30 yard pin, and the angle between the 30 and 20 yard pins mentioned above, a weight equivalent to pin 2 was moved across the base 4 (which is suspended from the archer's finger) until the base is tilted to the proper angle from the horizontal to the 30 yard pin previously calculated at 18° 26 06″. With base 4 at this proper attitude, pin 2, which designates the 20 yard distance, is then positioned to the point where the angle (8° 07 48″) between the 30 and 20 yard pins is achieved. This point is then marked on base 4. The procedure is repeated for several heights of 5 foot increments in this case and a curve is delineated. The slot is then formed by cutting a path through the marks.

The adjustable pin 2 is then disposed in the slot and will be moved accordingly therein depending upon the archer's height in the tree. In use, the pin 2 will always designate the 20 yard distance when the same is sight aligned by the user with pin 1 to designate the 20 yard ground distance, while the sight alignment of pins 1 and 3 will designate the 30 yard distance. As seen in FIGS. 4 and 5, the 20, 30 yard distances will always be the same notwithstanding the archer's height in the tree as the rangefinder will tilt accordingly due to the weight of pin 2.

Additionally, and as seen in FIG. 1, the slot 7 is extended to terminate in a marking at the end thereof marked "level" to designate a reading when the user's elevated position is located on a hilly terrain such as shown at HT in FIG. 4. In this situation, the archer moves the 20 yard pin 2 to the level setting and, by sighting along all three pins 1, 2, and 3, which will be aligned by design, he positions himself down the hill so that his eye is on a level with the base of the tree. He then scans the device left and right to find a level plane passing through the base of the tree. While doing this, he chooses several landmarks at various distances not known to him which are located in the level plane and, when he climbs into the tree, the rangefinder is sighted on this imaginary level plane. By using the rangefinder as described hereinabove, the exact ground distances can be quickly and easily established.

To use the device it is imperative that the hunter's height above ground be known and this is readily determined by placing distance knots or tags on the rope used by him to haul his equipment up to the stand. By tensioning the rope, he will know the distance to the base of the tree stand TS, FIGS. 4, 5, and by adding his height he will easily determine the total distance above ground. He then slides the adjustable pin 2 in the slot 7 to the indicia line indicating this height, for example, if he is 10 feet above ground level, adjustable pin 2 will be set at the 10 foot marking. Loop 6 is then placed over the hunter's index finger and the device is suspended therefrom, and can be steadied with gentle pressure with the remaining fingers of his hand. The device will dangle to an angular position and the archer then eyes fixed sight pins 1 and 3 which will give him a 30 yard reading and then by aligning and eyeing pins 1 and 2 he will determine the 20 yard reading. While doing this, the archer selects a landmark for the 20 and 30 yard distances for further reference.

The archer then repeats the above process in several directions around the tree to determine the 20 and 30 yard ground distances thereabout.

If the rangefinder is to be mass produced, and the recalibrating of the slot 7 is to be avoided, each individual part should be substantially identical and the relative position of all parts cannot be changed. The base should be of consistent weight and density.

Also, while the base member is disclosed as being rectangular, the same can take any shape and the slot formation will be determined in the same fashion as described hereinabove.

It is considered to be within the scope of the present invention to have alternative designs for the present rangefinder and several embodiments are seen in FIGS. 8-14 inclusive.

In the FIG. 8 embodiment, the 30 yard sight pin 3 moves along slot 7 in the same fashion as adjustable 20 yard pin 2 in the FIG. 1 embodiment and is used to designate the archer's height above ground.

In the FIG. 9 embodiment, the base 4 is designated by a pair of upper and lower wires W,W1 joined at its ends by sight pin 1 with 30 yard pin 3 being fixed to the end of the upper wire W. The bottom wire W1 is shaped to delineate the curve of slot 7 of the preferred embodiment with indicia means placed thereon in the form of notches N or by otherwise marking the same thereon with print, paint, etc. Adjustable pin 2 is disposed on a slidable member X which is then moved to the user's above-ground height as in the FIG. 1 embodiment.

As seen in the end view of FIG. 10, the slidable member X is seen to be of U-shaped configuration with the U portion thereof straddling the upper wire W. Aligned openings $7,7^1$ are formed in the lower part of each of the legs and receive the 20 yard pin 2 therein thereby trapping the lower wire W therebetween.

Figure 11:
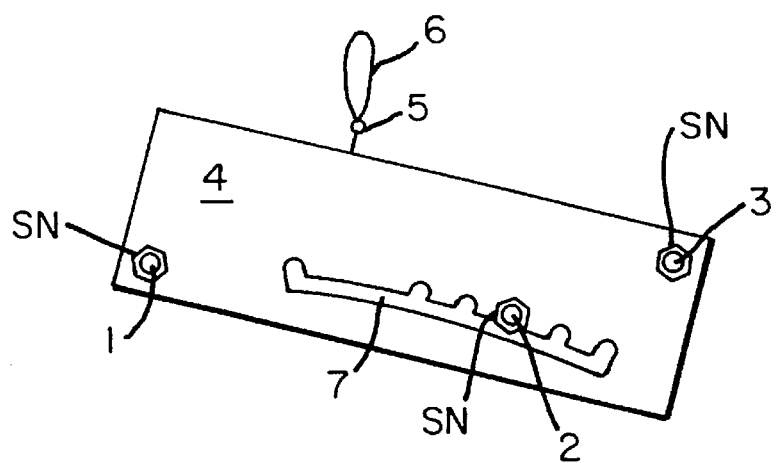
FIG. 11 is a side elevational view of a fourth embodiment of the invention.

The FIG. 11 embodiment is similar to that of FIG. 1, differing in that slot 7 is provided with a plurality of notches with each notch designating a different height, as in the FIG. 1 embodiment, to receive pin 2 therein.

Figure 12:
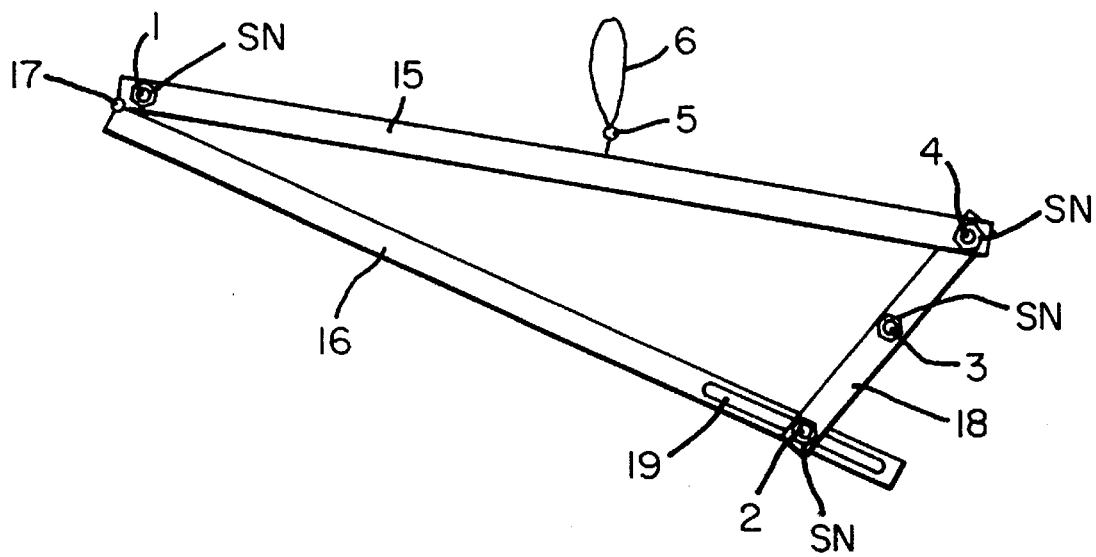
FIG. 12 is a side elevational view of a fifth embodiment of the invention.

In the FIG. 12 embodiment, the base member 4 takes the form of a pair of spaced members 15,16 pivotally joined at one end 17 supporting rear sight pin 1 with the free ends joined by a connecting arm 18. The arm 18 has pins 2, 3 and 4 disposed thereon with 20 yard pin 2 cooperating with the slot 19 in arm 16, as in the FIG. 1 embodiment, as it pivots about pin 4. Arm 18 and the attached pins cause the base to tilt in the same manner as previously described but, with the pins being commonly mounted on arm 18, three different ground differences can be determined when aligned with sight pin 1.

Figure 13:
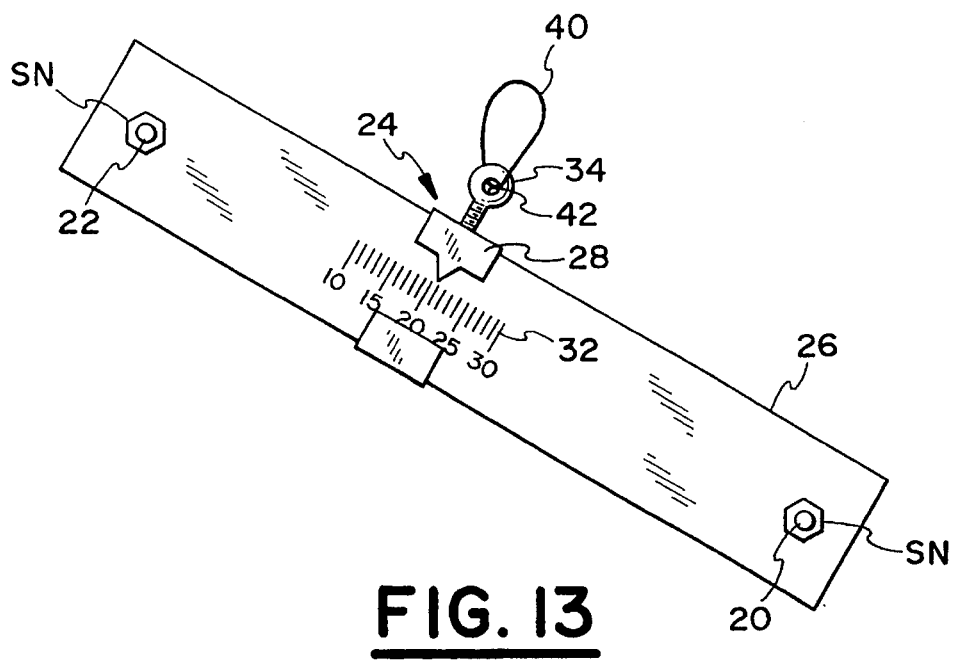
FIG. 13 is a side elevational view of a sixth embodiment of the invention.
Figure 14:
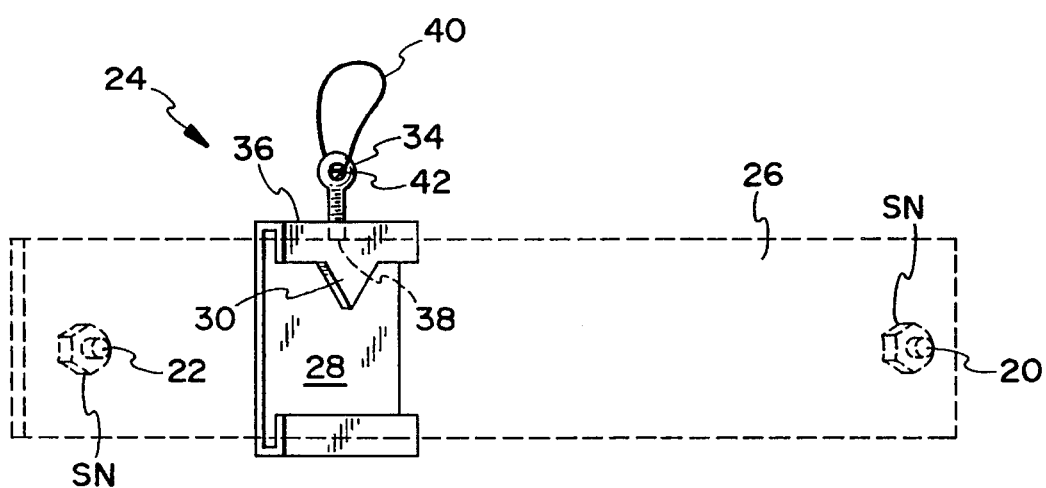
FIG. 14 is a left perspective view of the sliding bracket used in the embodiment shown in FIG. 13.

FIGS. 13 and 14 disclose a sixth embodiment of the invention which is similar to the first embodiment disclosed in FIG. 1–7, with the basic difference being that only front and rear sight pins 20 and 22, respectively, are provided, and suspension means 24 is slidably disposed about base member 26. Sight pins 20 and 22 are preferably fixedly mounted on base member 26. Since both pins 20 and 22 are fixed, this embodiment is more suitable for determining one pre-set distance. In particular, the position of front sight pin 20 on the base member 26 is selected so as to point 20 yards. It should be noted, however, that it is well within the scope of this invention to vary the positions of front and rear side pins 20 and 22 to indicate the different yardages.

As best shown in FIG. 14, suspension means 24 is in the form of a generally C-shape straddle member 28 which slides over base member 26 to indicate an above-ground height. In particular, straddle member 28 includes pointer 30 directed at pre-calibrated above-ground height markings 32, as in the previous embodiments, on base member 26. In order to immobilize straddle member 28 at a desired location on base member 26, screw-eye fastener 34 is provided in a hole on top 36. As best shown in FIG. 14, bottom 38 of fastener 34 engages base member 26 thereby rendering straddle 28 immobilized relative thereto.

As in the previous embodiments, loop 40 is threaded through eye 42 of the fastener 34 for suspending the device from the archer's finger for determining the desired pre-fixed distance. As in the previous embodiments, sight pins 20 and 22 each includes a screw-nut (SN). It should be noted, however, that other types of fasteners may be used. Further, alternative configurations, such as a base member with molded pins, can also be used. The device of the sixth embodiment can be used in the like manner as the previous embodiments.

While this invention has been described as having preferred designs it is understood that it is capable of further modifications, uses and/or adaptations of the invention following in general the principle of the invention and including such departures from the present disclosure as come within the known or customary practice in the art to which the invention pertains, and as may be applied to the central features hereinbefore set forth, and fall within the scope of the invention and the limits of the appended claims.

What I claim is:

1. A self-contained hand-held device for measuring distance from an above-ground position, comprising:
   a) a support member;
   b) first and second projection members on said support member for measuring a preselected distance;
   c) said first projection member including a sight pin;
   d) means associated with said support member for indicating an above-ground height; and
   e) means for suspending the device freely in a vertical plane;
   f) whereby when the device suspends freely in a vertical plane, said first and second projection members cooperate spatially to point a location corresponding to said preselected distance.

2. The distance measuring device of claim 1, wherein:
   a) said sight pin is fixedly mounted on said support member.

3. The distance measuring device of claim 1, wherein:
   a) said height indicating means comprises a plurality of pre-calibrated markings for indicating differing above-ground heights.

4. The distance measuring device of claim 1, wherein:
   a) said second projection member comprises a distance measuring pin mounted on said support member.

5. The distance measuring device of claim 1, wherein:
   a) said height indicating means comprises a straddle member slidably disposed on said support member.

6. The distance measuring device of claim 5, wherein:
   a) said straddle member is generally C-shaped.

7. The distance measuring device of claim 5, wherein:
   a) said straddle member includes a pointer;
   b) said height indicating means further includes a plurality of pre-calibrated markings; and
   c) said pointer cooperates with said markings to indicate differing above-ground heights.

8. The distance measuring device of claim 5, and including:
   a) means for immobilizing said straddle member at a desired location on said support member.

9. The distance measuring device of claim 1, wherein:
   a) said height indicating means is slidably disposed on said support member;
   b) said support member includes a fulcrum point; and
   c) said fulcrum point is movable so as to correspond with the location of said height indicating means on said support member.

* * * * *